United States Patent [19]

Porter-Bennett

[11] 4,391,041

[45] Jul. 5, 1983

[54] POWERED GROUND CARE IMPLEMENT

[75] Inventor: David E. Porter-Bennett, Willmar, Minn.

[73] Assignee: The Toro Company, Minneapolis, Minn.

[21] Appl. No.: 255,571

[22] Filed: Apr. 20, 1981

[51] Int. Cl.³ .......................................... A01D 50/00
[52] U.S. Cl. ..................................... 30/296 R; 172/41
[58] Field of Search ................... 30/296 R, 276, 240; 172/41; 56/12.7

[56] References Cited

U.S. PATENT DOCUMENTS 3,219,129  11/1965  Yamada ........................... 30/296 R

FOREIGN PATENT DOCUMENTS 1478283  6/1977  United Kingdom ............. 30/296 R
2027324  2/1980  United Kingdom ............. 30/296 R Primary Examiner—Jimmy C. Peters
Attorney, Agent, or Firm—James W. Miller

[57] ABSTRACT

A powered ground care implement (2) includes a rotatable cutting head (14) having a filament line (16) for severing ground growing vegetation. An upwardly extending handle assembly (4) includes an engine (10) mounted at the top thereof. Engine (10) is fixedly secured to a backing plate (30) which is mounted by rubber mounting blocks (60) in an engine housing (12) secured to handle assembly (4). This vibrationally isolates engine (10) from handle assembly (4). Starter (80) having an active element (91) and a passive element (93) is contained in engine housing (12) with the active element (91) being secured to engine (10). In addition, a flexible drive cable (100) has an output end (101) nonrotatably received in recess (102) in the end of the crankshaft (23) of the engine (10).

14 Claims, 13 Drawing Figures

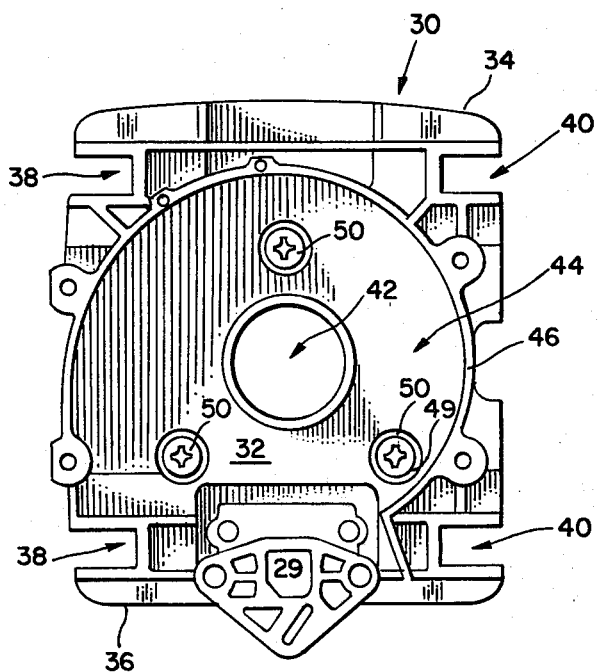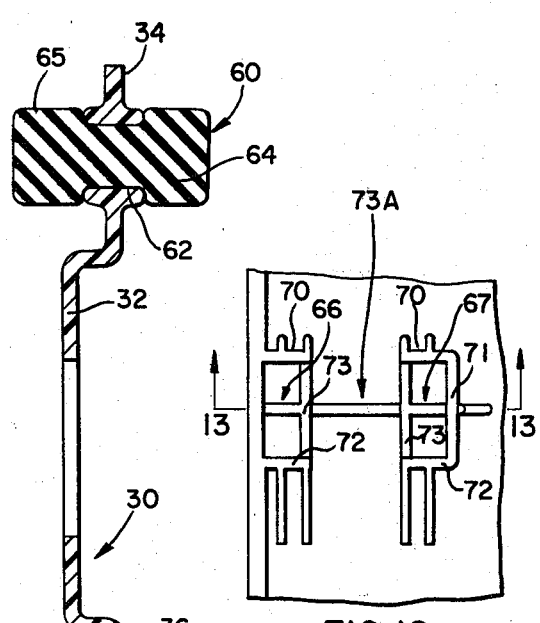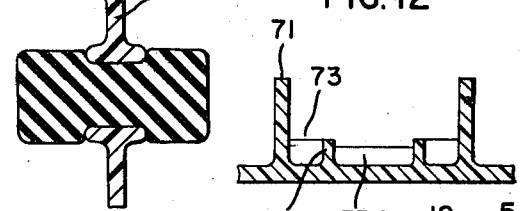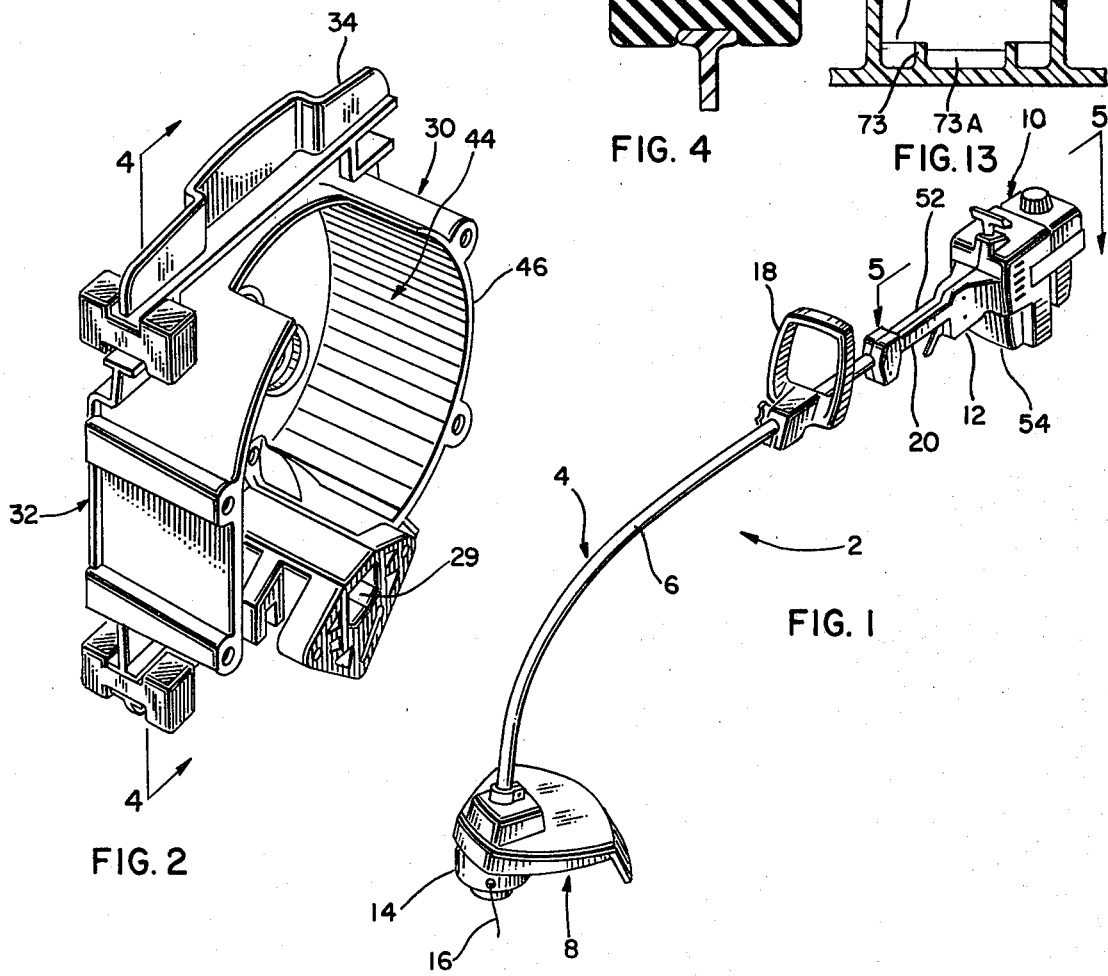

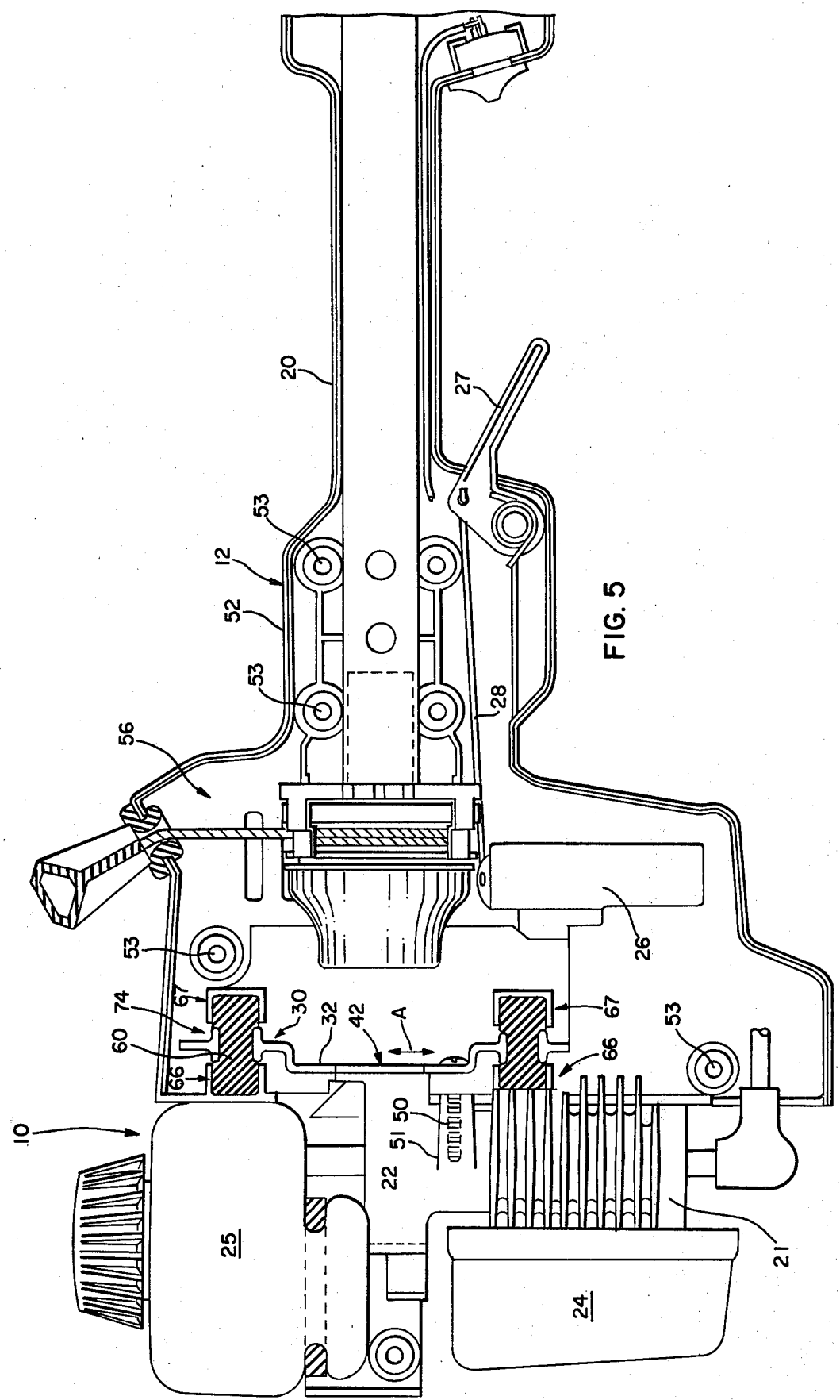

POWERED GROUND CARE IMPLEMENT

TECHNICAL FIELD

This invention relates to a powered ground care implement which is hand-held, such as a filament line grass trimmer or a small snow thrower. More particularly, this invention relates to the engine and drive train systems used in such an implement.

DESCRIPTION OF THE PRIOR ART

Small hand-held implements are known in the outdoor power equipment industry for performing various ground grooming or working functions. An example of such an implement is a filament line grass trimmer. This type of trimmer includes a cutting head that has an outwardly extending filament line which severs ground growing vegetation, such as grass, during rotation of the cutting head. The cutting head is located at the lower end of a handle assembly comprising an upwardly extending tube. The handle assembly is long enough so that a standing operator can hold the handle assembly and position the cutting head closely adjacent the ground.

Certain trimmers of this type use an internal combustion engine mounted on the handle assembly, usually at the upper end. Engine vibration is a significant factor when such an engine is used. A manual pull-type rope starter is carried on the engine to allow the operator to start the engine by pulling the rope. In addition, the engine itself is rigidly fixed to the handle assembly by bolting the engine into a housing that is rigidly secured to the handle assembly. Thus, engine vibration will be transmitted both to the handle assembly and to the starter.

Various disadvantages arise when engine vibration is transmitted to the handle assembly and starter in this manner. For one thing, the handle assembly is hard for the operator to hold because of the vibration. Furthermore, if the operator uses the implement for an extended length of time, his exposure to the vibration can have deleterious physical side effects, such as a temporary loss of strength in his hands. In addition, the engine vibration has a destructive effect on the starter and shortens its normal useful life. This results in more frequent replacement of the starter which is an economic disadvantage either to the consumer or the manufacturer if the failure occurs during the warranty period.

Grass trimmers of the type being discussed also include a flexible drive shaft or cable extending from the engine to the cutting head for rotating the cutting head. This drive cable is often attached to the crankshaft of the engine through a clutch. If no clutch is used, then some type of bracket is used which receives the drive cable and attaches to the crankshaft. This type of attachment method is relatively expensive since it requires components, such as the clutch or the bracket with its associated securing members, that might not otherwise be required. In addition, this attachment method is cumbersome since it requires additional assembly steps during the manufacture of the trimmer. This further increases the cost of the product.

SUMMARY OF THE INVENTION

This invention relates to a powered ground care implement of the hand-held type which obviates, either in combination or individually, the disadvantages noted above relating to engine vibration, starter deterioration and drive cable attachment.

One aspect of this invention relates to a powered ground care implement having an active means which performs a grooming or working action on the ground or on ground growing vegetation. An elongated upwardly extending handle assembly is provided having a lower end on which the active means is carried. The handle assembly is sufficiently long such that a standing operator can hold the handle assembly and position the active means closely adjacent to or in contact with the ground. Engine means is provided for driving the active means. Means for mounting the engine means on the handle assembly is included. This mounting means comprises means for vibrationally damping or isolating the engine means from the handle assembly to help an operator hold the handle assembly when the engine means is running. In conjunction with this vibrational damping feature, another aspect of this invention relates to the use of a starter having active and passive elements which selectively engage to start the engine means. The passive element is carried on the engine means and the active element is carried on the handle assembly to isolate the active element of the starter from the engine vibration. This increases starter life.

Yet another aspect of this invention relates to a powered ground care implement having an active means for performing a grooming or working action on the ground or on ground growing vegetation. An elongated upwardly extending handle assembly is provided having a lower end on which the active means is carried. An engine means is provided for driving the active means. In addition, a flexible drive cable extends between the engine means and the active means for driving the active means in a rotary manner. The driven end of the drive cable, which attaches to a crankshaft to the engine means, has a cross-sectional configuration which non-rotatably mates in a recess in the output end of the crankshaft to attach the drive cable thereto without the use of any additional brackets or the like.

BRIEF DESCRIPTION OF THE DRAWINGS

This invention will be described in more detail hereafter, when taken in conjunction with the following drawings, in which like reference numerals refer to like elements throughout.

FIG. 1 is a perspective view of an improved ground care implement according to this invention;

FIG. 2 is a perspective view of a portion of the engine mounting means for the implement shown in FIG. 1, particularly illustrating the backing plate for the engine and two of the rubber mounting blocks received in the backing plate;

FIG. 3 is a top plan view of the backing plate shown in FIG. 2;

FIG. 4 is a cross-sectional view of the backing plate and rubber mounting blocks, taken along lines 4—4 in FIG. 2;

FIG. 5 is a cross-sectional view of the upper portion of the implement shown in FIG. 1, taken along lines 5—5 in FIG. 1, and particularly illustrating the engine housing and engine of the implement;

Figure 8:
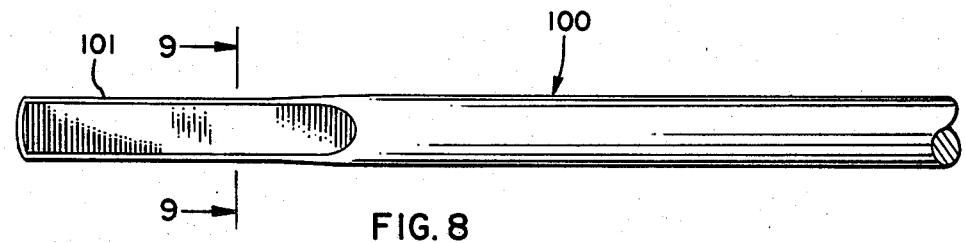
Figure 9:
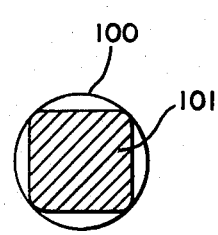
Figure 10:
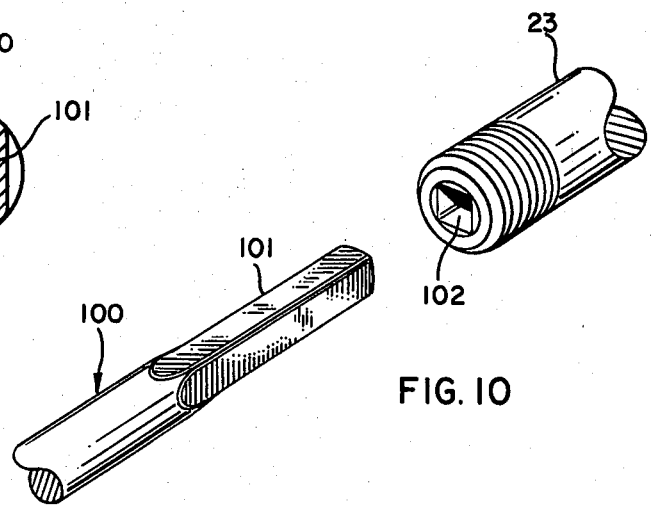
Figure 11:
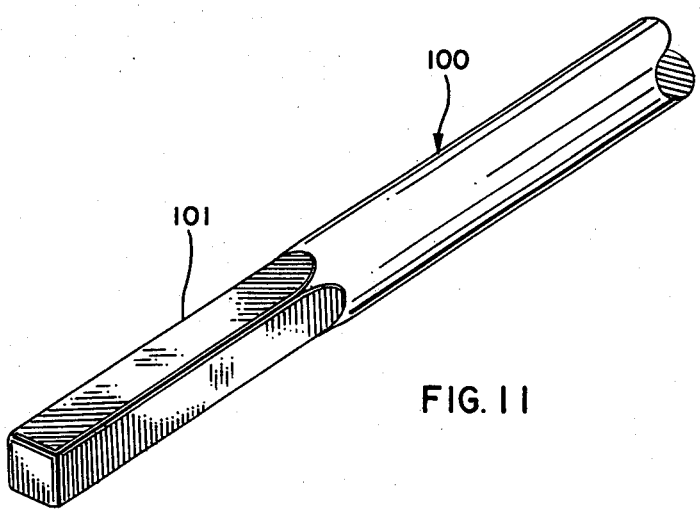

6, particularly illustrating these components in an assembled relationship;

FIG. 8 is a side elevational view of the end of the drive cable which attaches to the crankshaft for use in the implement of FIG. 1;

FIG. 9 is a cross-sectional view of the drive cable taken along lines 9—9 in FIG. 8;

FIG. 10 is a perspective view of the drive cable and the engine crankshaft, particularly illustrating the square end of the drive cable and the recess in the crankshaft into which this end fits;

FIG. 11 is a perspective view of the square end of the drive cable;

FIG. 12 is a side elevational view of the recess in the engine housing in which the rubber mounting blocks are contained; and FIG. 13 is a cross-sectional view of the recess in the engine housing in which the rubber blocks are contained taken along lines 13—13 in FIG. 12.

DETAILED DESCRIPTION

Referring first to FIG. 1, an improved ground care implement according to this invention is generally illustrated as 2. Implement 2 as illustrated throughout is a flexible line grass trimmer. Such a trimmer includes an upwardly extending handle assembly 4 comprising an elongated and hollow handle tube 6. An active means 8 for performing a ground grooming or working operation is located at the lower end of handle tube 6. An engine 10 for driving active means 8 is located in an engine housing 12 at the upper end of handle tube 6.

In the case of a filament line grass trimmer, active means 8 comprises a rotatable cutting head 14 having an outwardly extending length of filament line 16. When cutting head 14 is rotated about a vertical axis, filament line 16 will swing in a horizontal cutting plane to trim grass or other ground growing vegetation. Handle assembly 4 is sufficiently long so that a standing operator can hold the handle assembly 4 and position active means 8 closely adjacent to or in contact with the ground. In this regard, handle tube 6 is provided with a first longitudinally adjustable grip 18 and a second fixed grip 20 on engine housing 12 itself. The operator can hold the grips 18 and 20 with his two hands to properly position the active means 8 in proximity to the ground.

While implement 2 has been illustrated as being a flexible line grass trimmer, the important features of the present invention, which relate to a mounting for the engine 10, its starter and for an attachment method for the drive cable leading from the engine, are not limited for use with a grass trimmer. Some or all of these teachings may be incorporated in other similar products. For example, The Toro Company of Minneapolis, Minn., manufactures a small lightweight snow thrower known as the Power Shovel. The Power Shovel includes a housing at the lower end of an elongated handle tube. This housing carries a rotatable snow throwing impeller that defines the active means. The handle tube is sufficiently long so as to be held by a standing operator with the housing in contact with the ground for throwing snow relatively long distances. Such a product could have an engine mounted at the upper end of the handle tube in the same manner to be described with respect to the trimmer so that the teachings of the present invention will be equally applicable to such a product. Thus, the present invention relates to powered implements generally of the type having an active means carried on a handle assembly suited to be hand-held.

Engine 10 is a two-cycle internal combustion engine of any generally conventional design. Referring to FIG. 5, engine 10 includes a single cylinder 21 extending to one side of a housing 22 that encloses the crankshaft 23 of the engine, a muffler 24, a fuel tank 25, and a carburetor 26. A pivotal throttle 27 located in engine housing 12 adjacent hand grip 20 is linked by a connecting rod 28 to carburetor 26 for adjusting the speed of engine 10. While carburetor 26 appears to be separated from cylinder 21 in FIG. 5, the fuel-air mixture is conducted from the carburetor 26 into cylinder 21 through a fuel passageway 29 located in a backing plate or mounting member 30 for engine 10. See FIGS. 2 and 3. Fuel passageway 29 extends through backing plate 30 and mates with carburetor 25 with the fuel-air mixture passing from carburetor 25, through the passageway 29 and into the intake manifold of cylinder 21. Passageway 29 is relatively long, e.g. on the order of two inches long, for a purpose described hereafter. A spark plug fires the fuel-air mixture in cylinder 21 to drive a piston (not shown) which is received in cylinder 21 and attached to crankshaft 23.

Referring now to FIGS. 2-4, the backing plate 30 comprises a vertically extending wall 32 having forwardly offset L-shaped top and bottom edges 34 and 36 respectively. Each of the edges 34 and 36 is provided with horizontal inwardly extending slots 38 and 40 located at the opposite left and right sides of the edges. See FIG. 3. In addition, vertical wall 32 is provided with a central opening or aperture 42 through which the crankshaft 23 of engine 10 extends. Opening 42 leads into a circular recess 44 provided by a circular peripherally extending wall 46 that surrounds aperture 42 and extends outwardly from one side of vertical wall 32. Recess 44 is sufficiently large to receive therein a flywheel 48 located on the end of crankshaft 23. Neither the crankshaft 23 nor the flywheel 48 are shown in FIG. 5 to enhance the clarity of the illustration. In addition, vertical wall 32 has a plurality of small openings 49 surrounding aperture 42 through which treaded securing members, such as tap screws or bolts 50, extend. Bolts 50 bear against wall 32 and are threadedly received in apertures in bosses 51 on engine 10 to fixedly secure engine 10 to backing plate 30.

Backing plate 30 and engine housing 12 may be made from any suitable materials, preferably plastic. The use of plastic with respect to banking plate 30 in conjunction with the relatively long fuel passageway 29 is important. The length of passageway 29 reduces the rate of heat transfer from engine cylinder 21 to the carburetor 26. This rate of heat transfer is also reduced since backing plate 30 is made from plastic, i.e. a nonmetallic material, and fuel passageway 29 is contained in backing plate 30 extending between carburetor 26 and engine cylinder 21. This reduction in the rate of heat transfer improves starting of the engine after the engine has achieved a warm condition. If desired, cooling apertures may be provided in backing plate 30 to vent high pressure cool air across the crankcase, upper muffler surface and lower gas tank surface. This cooling aids in avoiding the boiling of fuel in the gas tank.

Engine housing 12 is made in a clamshell manner having first and second substantially identical halves 52 and 54. Housing halves 52 and 54 may be mated together around the upper end 7 of handle tube 6. They are then secured together using suitable threaded securing members (not shown), such as bolts, extending between them and received in threaded apertures 53.

Housing halves 52 and 54 define a hollow cavity 56 into which the upper end 7 of handle tube 6 extends to a position relatively closely adjacent backing plate 30.

Crankshaft 23 of engine 10 preferably has a balance factor in the range of 5-13%. The balance factor is the ratio of the weight needed as counterweight on the crankshaft to the mass of the reciprocating piston piston pin component and upper portion of the connecting rod components. Such a balance factor for crankshaft 23 distorts the normal vibration curve exhibited by a typical two-cycle engine where the crankshaft has a customary balance factor of 40-60%. A balance factor in the 5-13% range minimizes side-to-side vibration of the motor, both fore and aft and from left to right, but exaggerates the vertical vibration of the engine as illustrated by the arrows A in FIG. 5. In effect, the only substantial vibration component for engine 10 occurs in the vertical direction A.

Engine 10 includes a plurality of vibration isolation mounting blocks 60 each having the shape of a dog bone. Blocks 60 are preferably made from a relatively hard elastomeric material such as rubber. Referring to FIG. 4, each block 60 has a reduced thickness central portion 62 sized to be received in one of the slots 38 and 40 on backing plate 30. In addition, each block 60 includes enlarged square ends 64 and 65 on either side of central portion 62, which extend out in front of and in back of wall 32 of backing plate 30.

Each of the square ends 64 and 65 is captured in a square recess 66 or 67 suitably located and molded in the housing halves 52 and 54. See FIG. 12. Each of the square recesses 66 and 67 is defined by three walls 70, 71 and 72 which define a U-shaped recess and are backed along one side by ribs 73 to give the recess depth. The ribs 73 are located so that the depth of the recess 66 is equal to the depth of the square ends 64 and 65 on block 60. Recesses 66 and 67 are open from the other side i.e. the side opposite ribs 73, to allow the square ends 64 and 65 to be merely slid into them. In addition, recesses 66 and 67 are opposed to one another with the walls 71 of each defining a length to the recess approximately equal to the entire length of block 60. Recesses 66 and 67 are also separated by a space 74 which is large enough to allow the vertical wall 32 of backing plate 30 to be freely received therein. See FIG. 5. In addition, this space 74 is backed along one side by a rib 73A located between the ribs 73 which back recesses 66 and 67. Referring to FIG. 13, rib 73A is somewhat deeper than the ribs 73 to allow some limited side motion of the central portion 62 of each mounting block 60. This allows isolation of small amplitude vibration in a side to side and rotational mode. This clearance between the side of the central portion 62 of the block and rib 73A also allows unrestricted vertical motion of the central portion 62 since the central portion is then not rubbing against rib 73A.

When the engine 10 is fixedly secured to the backing plate, using bolts 51, the vibration isolation provided by mounting blocks 60 will prevent substantial transmission of the vibration from the engine 10 to the engine housing 12 and thus to the handle assembly 4. The system disclosed herein is particularly effective in damping out vertical vibration of the engine, or vibration in one direction, which is especially required by the type of crankshaft 23 utilized in engine 10. Because the mounting blocks 60 have their ends 64 and 65 solidly captured in the recesses 66 and 67 and because blocks 60 are relatively stiff, fore and aft and side to side vibration is not minimized as nearly as much as the vertical vibration. However, the components of these vibrations are generally so small for engine 10 that they do not contribute significantly to the overall vibration of the engine. Some side to side vibration can be accommodated by virtue of the side motion of the central portion 62 of each block 60 allowed by the spacing of rib 73A as noted earlier. Blocks 60 are nonetheless flexible in effectively damping out vertical vibration in the direction of arrows A since central portion 62, and with it backing plate 30, can flex up and down in the space 74 relative to the solidly held ends 64 and 65. Thus, the vibration isolation system disclosed herein allows the engine to be firmly and securely mounted in the engine housing (by the solid capture of the block ends 64 and 65 in recesses 66 and 67) with a major portion of its vibration still being damped or isolated. Furthermore, the engine can be easily installed in the housing merely by attaching the engine to the backing plate, sliding the blocks 60 on one side of the backing plate 30 into the appropriate recesses 66 or 67 in one of the housing halves 52 or 54, sliding the other housing half down over the backing plate 30 until the other mounting blocks 60 on the backing plate are captured in the other recesses 66 or 67 and the housing halves 52 and 54 have become mated, and thereafter securing the housing halves together using threaded fasteners.

The vibration isolation system according to this invention gives numerous advantages. The primary one is that the operator can more easily hold the handle assembly while operating implement 2. This is especially important when the implement is operated for long periods of time since the hands of the operator would otherwise tend to become quite tired. In addition, the particular vibration isolation system disclosed herein is efficient in terms of material, requiring only four mounting blocks 60 located in approximately the same plane, and is easily installable in a clamshell type of housing comprising housing halves 52 and 54. Thus, the vibration isolation system is not difficult to install or service by virtue of the manner in which the blocks 60 slide into and out of recesses 66 and 57.

Figure 6:
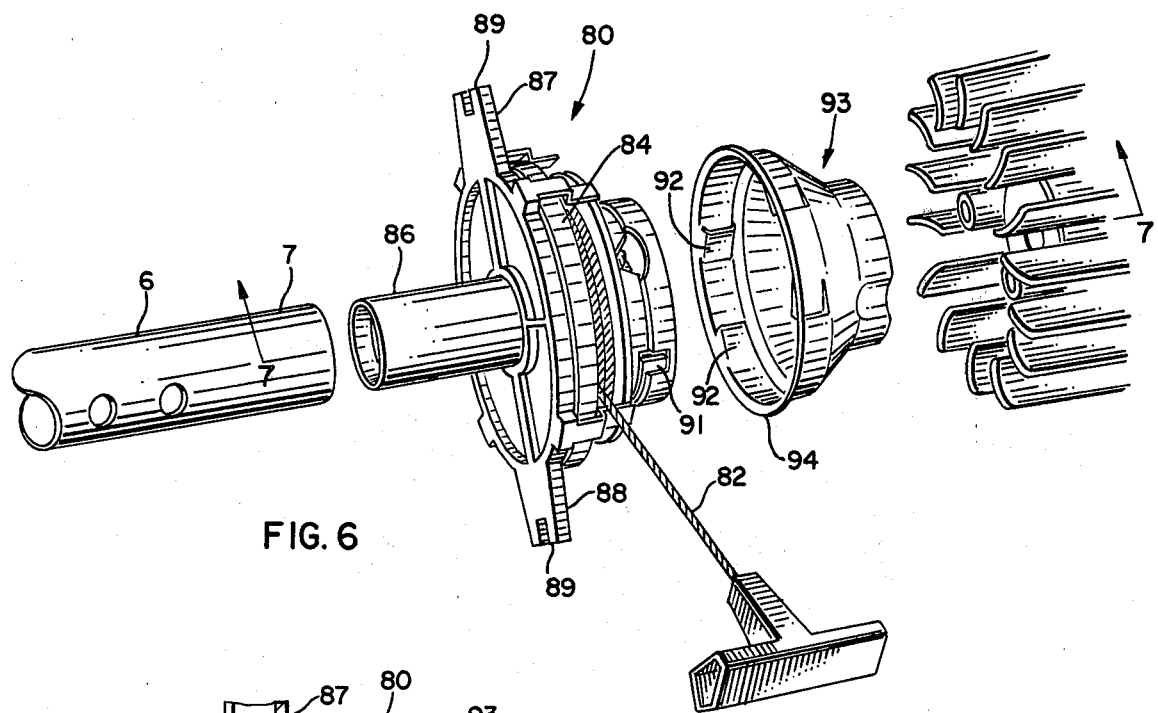
FIG. 6 is an exploded perspective view of the starter for the engine of the implement shown in FIG. 1, particularly illustrating the active and passive elements of the starter and the flywheel of the engine.
Figure 7:
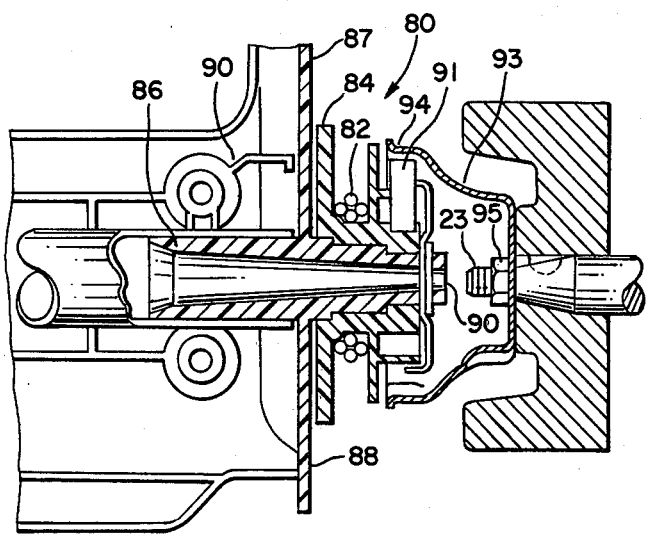
FIG. 7 is a cross-sectional view of the starter and flywheel shown in FIG. 6, taken along lines 7—7 in FIG.

In conjunction with the vibration isolation of engine 10, an improved starter generally illustrated as 80 is also used with engine 10. Referring to FIGS. 6 and 7, starter 80 is a manual rope-type pull starter of conventional design having a starting rope 82 wound on a spool portion 84. Spool 84 is rotatably mounted on an elongated central mounting hub or tube 86 having outwardly extending side flanges 87 and 88. Side flanges 87 and 88 are notched at 89 at their outer ends. See FIG. 6. Tube 86 is hollow having an elongated central passageway 90 extending all the way therethrough. Tube 86 is simply dropped into the upper end 7 of handle tube 6. It is held in place inside engine housing 12 by virtue of the notched side flanges 87 and 88. Notches 89 in these side flanges are received on flanges (not shown) in each of the housing halves 52 and 54 when the housing halves are mated with one another and secured together. This fixes the position of starter 80 inside engine housing 12.

Starter 80 has an active element which comprises an outwardly extendable starting lug 91. Lug 91 is shown retracted in FIG. 6 and extended in FIG. 7. When rope 82 is pulled rotating spool 84, this rotation will cause a means carried by spool 84 to act on the starting lug 91 to extend lug 91 outwardly relative to spool 84. Lug 91 extends outwardly sufficiently far until it engages against one of a plurality of ears 92 located on the inside of a cup-shaped element 93. Ears 92 are circumferentially spaced around the inner diameter of a peripheral rim 94 on element 93 which surrounds the location of lug 91 on the free end of spool 84. Thus, lug 91 comprises the active element of the starter, i.e. the element which is actuated by movement of the rope, and element 93 comprises the passive element, i.e. the element which is rotated in response to the extension of the lug 91. Element 93 is fixedly secured to a threaded output end of the crankshaft 23 by a nut 95 and abuts against an inner hub of the flywheel 50 as shown in FIG. 7. Starter 80 as described herein, except for the separation of the active and passive elements 91 and 93 and the structure for mounting starter 80 in housing 12, is generally conventional and is made by Eaton Metal Stampings.

The above noted starter arrangement is particularly advantageous. The primary reason is that the active element or portion of the starter, i.e. the extendable lug 91, is isolated from the vibration of engine 10 since it is fixed or secured in engine housing 12 and engine 10 is vibrationally isolated from the engine housing. The only element of the starter 80 connected directly to engine 10 is the passive element 93. This is a rugged portion of the starter and is not prone to failure. Thus, by mechanically isolating those components of the starter which are likely to fail from the engine vibration, the life of starter 80 will be extended.

The final feature of the present invention is the method by which the flexible drive cable 100 which extends between engine 10 and the active means 8 is attached to crankshaft 23. Drive cable 100 reaches crankshaft 23 from the active means by extending up through the hollow handle tube 6 and through the elongated passageway 90 in starter 80 (cable 100 is not shown in FIG. 7 for clarity). Drive cable 100 is provided with a square driven end 101. In addition, the output end or the flywheel end of crankshaft 23 on which element 93 is received is enlarged and has a square recess 102 provided in the tip thereof. Recess 102 non-rotatably receives the square end 101 of drive cable 100. In addition, the length of the drive cable 100 between the crankshaft 23 and the active means is selected so that drive cable 100 when installed will be slightly under compression. This compression forces the square end 101 into the recess 102 and prevents it from slipping out since cable 100 tends to restore itself to an uncompressed state. Thus, drive cable 100 has been attached to the crankshaft of the engine without utilizing any extraneous brackets or clutches. Accordingly, the attachment method for drive cable 100 is an improvement over the prior art since it is less expensive in terms of components and is also extremely simple in installation.

Various modifications of this invention will be apparent to those skilled in the art. It has been seen that the vibration isolation system of this invention is particularly effective in damping out the vertical vibration of the engine and also damps limited side to side vibration by virtue of the spacing of rib 73A. If a crankshaft 23 is used in engine 10 which has a higher balance factor, additional side to side vibration could be accommodated by further spacing rib 73A apart from the side of the central portion 62 of mounting block 60. In addition, fore and aft vibration could be accomodated by making mounting blocks 60 somewhat compressible even when they are captured inside recesses 66 and 67. Thus, the scope of this invention is to be limited only by the appended claims.

I claim:

1. A powered ground care implement, which comprises:
   (a) active means for performing a grooming or working action on the ground or ground growing vegetation;
   (b) an elongated upwardly extending handle assembly having a lower end on which the active means is carried, the handle assembly being sufficiently long so that a standing operator can hold the handle assembly while positioning the active means closely adjacent to or in contact with the ground;
   (c) engine means for driving the active means, wherein the engine means has a crankshaft configured to cause engine vibration substantially more in a first direction than in other directions; and
   (d) means for mounting the engine means on the handle assembly, wherein the mounting means includes means for vibrationally isolating the engine means from the handle assembly to help an operator hold the handle assembly when the engine means is operating, wherein the mounting means has means for damping out vibration primarily in the first direction, and wherein the mounting means comprises:
      (i) a backing plate fixedly secured to the engine means;
      (ii) an engine housing fixedly secured to the handle assembly for receiving the backing plate;
      (iii) flexible means for mounting the backing plate in the engine housing so that vibration of the engine means is not transmitted to the housing.

2. An implement as recited in claim 1, wherein the engine means is an internal combustion engine.

3. An implement as recited in claim 1, wherein the crankshaft has a balance factor in the range of 2-20%.

4. An implement as recited in claim 3, wherein the crankshaft has a balance factor in the range of 5-13%.

5. An implement as recited in claim 1, wherein the flexible means comprises a plurality of flexible mounting blocks having a first portion secured to the backing plate and having a second portion secured to the housing, the first and second portions being capable of movement relative to each other in the first direction so that vibration of the engine means in the first direction is damped out.

6. An implement as recited in claim 1, wherein the mounting blocks have a central portion received in the backing plate and outwardly extending ends substantially immovably received in opposed recesses in the engine housing, wherein the central portion is free relative to the housing to deflect up or down relative to the ends of the blocks to damp out motion in the first direction.

7. An implement as recited in claim 6, wherein all the mounting blocks are located substantially in the same plane.

8. A powered ground care implement, which comprises:
   (a) active means for performing a grooming or working action on the ground or ground growing vegetation;
   (b) an elongated upwardly extending handle assemby having a lower end on which the active means is carried, the handle assembly being sufficiently long so that a standing operator can hold the handle assembly while positioning the active means closely adjacent to or in contact with the ground;
   (c) engine means for driving the active means;

(d) means for mounting the engine means on the handle assembly, wherein the mounting means includes means for vibrationally isolating the engine means from the handle assembly to help an operator hold the handle assembly when the engine means is operating; and (e) a starter comprising an active element and a passive element selectively engagable with the active element for starting the engine means, wherein the active element is fixedly carried by the handle assembly and the passive element is carried on the engine means so that the engine vibration is not transmitted to the active element of the starter.

9. An implement as recited in claim 8, wherein the active element of the starter comprises an outwardly extendable starting lug, and wherein the passive element of the starter includes a plurality of spaced ears any one of which is engageable by the starting lug in its extended position to rotatably couple the passive element to the active element for starting the engine means.

10. An implement as recited in claim 9, wherein the passive element includes a cup-shaped member secured to a crankshaft of the engine means.

11. A powered ground care implement, which comprises:
(a) active means for performing a grooming or working action on the ground or ground growing vegetation;
(b) an elongated upwardly extending handle assembly having a lower end on which the active means is carried;
(c) engine means for driving the active means, wherein the engine means includes a crankshaft having an output end; and
(d) a flexible drive cable extending between the engine means and the active means for driving the active means, wherein the drive cable includes a driven end having a cross-sectional configuration which is shaped to be non-rotatably received in a recess in the output end of the crankshaft, whereby the drive cable is attached to the crankshaft simply by virtue of the mating of its driven end and the output end of the crankshaft, and wherein the drive cable is under compression between the active means and the crankshaft to retain the driven end of the cable in the output end of the crankshaft.

12. A powered ground care implement, which comprises:
(a) active means for performing a grooming or working action on the ground or ground growing vegetation;
(b) an elongated upwardly extending handle assembly having a lower end on which the active means is carried, the handle assembly being sufficiently long so that a standing operator can hold the handle assembly while positioning the active means closely adjacent to or in contact with the ground;
(c) engine means for driving the active means; and
(d) means for mounting the engine on the handle assembly, wherein the mounting means includes means for vibrationally isolating the engine means from the handle assembly to help an operator hold the handle assembly when the engine means is operating, and wherein the mounting means comprises:
(i) a backing plate fixedly secured to the engine means;
(ii) an engine housing fixedly secured to the handle assembly for receiving the backing plate; and
(iii) a flexible means for mounting the backing plate in the engine housing so that vibration of the engine means is not transmitted to the housing.

13. A powered ground care implement, which comprises;
(a) active means for performing a grooming or working action on the ground or ground growing vegetation;
(b) a handle assembly on which the active means is carried;
(c) engine means for driving the active means; and
(d) means for mounting the engine means on the handle assembly, wherein the mounting means includes means for vibrationally isolating the engine means from the handle assembly to help an operator hold the handle assembly when the engine means is operating, wherein the mounting means comprises:
(i) a backing plate fixedly secured to the engine means;
(ii) an engine housing fixedly secured to the handle assembly for receiving the backing plate, the engine housing having a plurality of sets of opposed recesses therein; and
(iii) a plurality of flexible mounting blocks for securing the backing plate to the engine housing, wherein the mounting blocks have a central portion received in the backing plate and outwardly extending ends substantially immovably received in the opposed recesses of each set in the engine housing, wherein the central portion is free relative to the housing to deflect up or down relative to the ends of the blocks to damp out motion of the backing plate in a first direction.

14. A powered ground care implement, which comprises:
(a) an active means for performing a grooming or working action on the ground or ground growing vegetation;
(b) a handle assembly on which the active means is carried;
(c) engine means for driving the active means, wherein the engine means includes a cylinder and a carburetor for providing a fuel-air mixture which is burned in the cylinder; and
(d) means for mounting the engine means on the handle assembly, wherein the engine mounting means comprises a non-metallic backing plate secured to the engine means and received on the handle assembly for mounting the engine means thereon, wherein the backing plate has a fuel passageway located between the carburetor and the cylinder which fuel passageway is sufficiently long to substantially reduce the rate of heat transfer from the engine means to the carburetor, whereby starting of the engine in a warm condition is enhanced.

* * * * *